(12) United States Patent
Kumar et al.

(10) Patent No.: US 11,824,755 B2
(45) Date of Patent: Nov. 21, 2023

(54) COMMUNICATION ASSET USAGE METRICS

(71) Applicant: Hewlett-Packard Development Company, L.P., Spring, TX (US)

(72) Inventors: Sunil M Kumar, Bangalore (IN); Kotapati Vijaya Krishna, Bangalore (IN); Chandrasekhar Bandi, Bangalore (IN); Azghar Sheik Ali, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/770,765

(22) PCT Filed: Nov. 16, 2020

(86) PCT No.: PCT/US2020/070789
§ 371 (c)(1),
(2) Date: Apr. 21, 2022

(87) PCT Pub. No.: WO2021/154449
PCT Pub. Date: Aug. 5, 2021

(65) Prior Publication Data
US 2022/0385556 A1    Dec. 1, 2022

(30) Foreign Application Priority Data

Jan. 31, 2020  (IN) .............................. 202041004333

(51) Int. Cl.
*H04L 43/16* (2022.01)
*H04L 41/28* (2022.01)
*H04L 41/14* (2022.01)
*H04L 43/028* (2022.01)
*H04L 45/00* (2022.01)

(52) U.S. Cl.
CPC ............ *H04L 43/16* (2013.01); *H04L 41/145* (2013.01); *H04L 41/28* (2013.01); *H04L 43/028* (2013.01); *H04L 45/70* (2013.01)

(58) Field of Classification Search
CPC .. G06F 11/0793; G06F 16/24565; H04L 1/20; H04L 45/70; H04L 43/028
See application file for complete search history.

(56) References Cited

U.S. PATENT DOCUMENTS 7,127,461 B1   10/2006   Zhu et al.
9,608,980 B2    3/2017   Caffary, Jr.
(Continued)

OTHER PUBLICATIONS

"9 Tips for securing your SMB printer network", Epson Small Business blog post, Jun. 13, 2018 <https://blog.epson.com/small-business/9-tips-for-securing-your-smb-printer-network/>.
(Continued)

*Primary Examiner* — Barbara B Anyan
(74) *Attorney, Agent, or Firm* — Brooks, Cameron & Huebsch, PLLC

(57) ABSTRACT

Examples disclosed herein relate to tracking a usage metric for each of a plurality of communication assets, determining whether the usage metric fails to meet a threshold for each of the plurality of communication assets, and in response to determining that the usage metric fails to meet the threshold for at least one of the plurality of communication assets, causing the at least one of the plurality of communication assets to be disabled.

15 Claims, 3 Drawing Sheets

(56) References Cited

U.S. PATENT DOCUMENTS

| | | | |
|---|---|---|---|
| 10,011,213 B1* | 7/2018 | Palmer | G07C 5/008 |
| 10,744,647 B1* | 8/2020 | Baker | B25J 9/1697 |
| 2005/0213511 A1 | 9/2005 | Reece, Jr. et al. | |
| 2005/0246762 A1 | 11/2005 | Girouard et al. | |
| 2008/0097998 A1 | 4/2008 | Herbach | |
| 2009/0203352 A1 | 8/2009 | Fordon et al. | |
| 2011/0122768 A1* | 5/2011 | George | H04L 41/145 |
| | | | 370/228 |
| 2013/0318238 A1* | 11/2013 | Hall | H04L 43/028 |
| | | | 709/224 |
| 2015/0278040 A1* | 10/2015 | Sikkink | H04L 1/20 |
| | | | 714/5.1 |
| 2015/0350933 A1* | 12/2015 | Mannemala | H04W 24/04 |
| | | | 370/225 |
| 2016/0328307 A1* | 11/2016 | Lu | G06F 16/24565 |
| 2019/0250955 A1* | 8/2019 | Sethi | G06F 11/0793 |
| 2019/0392357 A1* | 12/2019 | Surti | G06Q 50/30 |
| 2020/0136943 A1* | 4/2020 | Banyai | H04L 45/70 |

OTHER PUBLICATIONS

"Disabling unnecessary services and protocols", Unused services and protocols, CERT NZ, 2019, <https://www.cert.govt.nz/it-specialists/critical-controls/unused-services-and-protocols/disabling-unnecessary-services-and-protocols/>.

"Network printer security best practices", System and application security, Berkeley information security office, UC Berkeley, 2019, <https://security.berkeley.edu/education-awareness/best-practices-how-articles/system-application-security/network-printer-security>.

Ricoh's Security Functions, Security for Ricoh multifunction printers, Ricoh, Accessed online Aug. 5, 2019, <https://www.ricoh.com/products/security/mfp/function/>.

"Securing printers and Multifunction Printing devices", Northwestern—Knowledge base, Jan. 3, 2017, Doc ID—69743, Owner—TSS DSS, <https://kb.northwestern.edu/page.php?id=69743>.

* cited by examiner

COMMUNICATION ASSET USAGE METRICS

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates).

Figure 1:
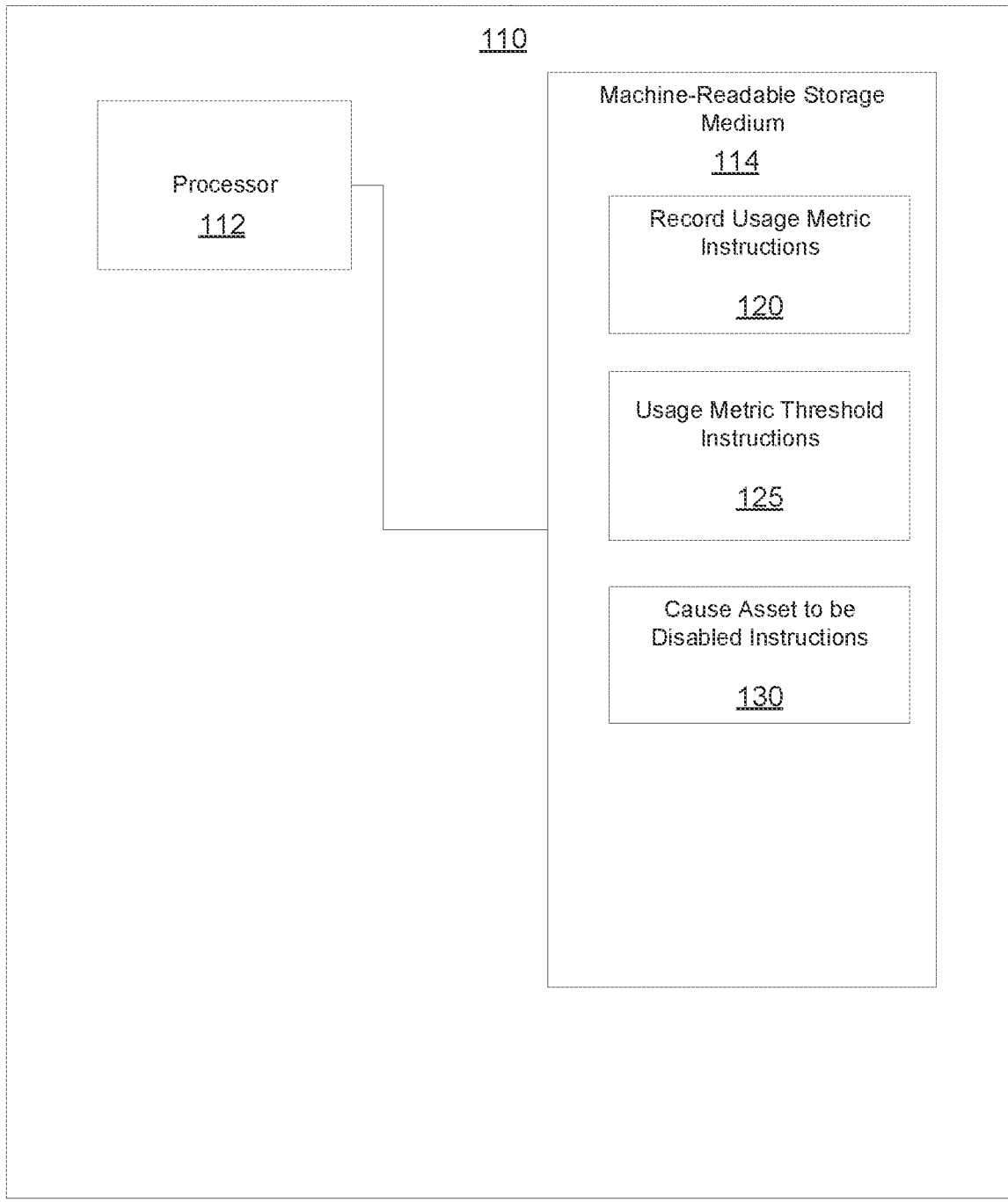
FIG. 1 is a block diagram of an example computing device for providing communication asset usage tracking.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Printers and similar MFPs may sometimes present a security threat as they are ubiquitous yet often overlooked. These devices may be directly connected to public networks, such as the Internet and may have access to sensitive information like confidential reports, contracts, medical records, and the like in the form of documents being scanned, copied, printed, etc. In some circumstances, MFPs may offer numerous communication assets to enable easy use of the functionality they provide. Such communication assets may comprise, for example, physical communication ports (e.g., USB, serial, parallel, etc.) and/or wired and/or wireless network assets such as ethernet ports, radio frequency identification (RFID), near field communication (NFC), Bluetooth, WiFi, etc. Communication assets may also comprise, in some implementations, services and communication protocols used by the device, such as TCP/IP, UDP, web services, management console and mobile app communication ports, Simple Network Management Protocol (SNMP) services, etc.

This variety of communication assets may be enabled on various devices and in various configurations but may present an unnecessary security risk. By tracking usage metrics for these assets, unneeded assets may be disabled and/or secured. For example, an SNMP service that has not been used in over a threshold period, such as 90 days, may be automatically disabled. For another example, an NFC reader that has only been used once in the last month may be presented with a recommendation to disable it to an administrator of the device.

FIG. 1 is a block diagram of an example computing device 110 for providing communication asset usage tracking. Computing device 110 may comprise a processor 112 and a non-transitory, machine-readable storage medium 114. Storage medium 114 may comprise a plurality of processor-executable instructions, such as record usage metric instructions 120, usage metric threshold instructions 125, and cause asset to be disabled instructions 130. In some implementations, instructions 120, 125, 130 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130.

Executable instructions 120, 125, 130 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Record usage metric instructions 120 may record, for at least one of a plurality of communication assets, at least one usage metric. The communication assets may comprise, for example, a network port, an application, a service, a physical communication link such as a USB port and/or communication cable, and/or a wireless communication link, such as RFID, NFC, Bluetooth, WiFi, etc. In some implementations, the usage metric may comprise a last used time for the at least one of the plurality of communication assets, a usage frequency for the at least one of the plurality of communication assets, a count of requests to use the at least one of the plurality of communication assets within a time period, and/or a count of unique users who request to use the at least one of the plurality of communication asset.

Usage metric threshold instructions 125 may determine, for the at least one of the plurality of communication assets, whether the at least one usage metric fails to meet a threshold. For example, a threshold for a usage metric comprising a last used time may comprise a usage frequency and/or an amount of time since the last time the communication asset was used, such as a 30 day threshold. If the communication asset has not been used within the threshold amount of time, instructions 125 may determine that the usage metric has failed to meet the threshold. For another example, a threshold for a usage metric comprising a count of requests and/or users of the communication asset may comprise a minimum number to be considered not to have failed to meet the threshold (e.g., two uses and/or users within the last 30 days would not satisfy a threshold of five uses). In some implementations, multiple thresholds may need to be met to avoid a communication asset being disabled.

Cause asset to be disabled instructions 130 may, in response to determining that the at least one usage metric fails to meet the threshold, cause the at least one of the plurality of communication assets to be disabled. In some implementations, causing the at least one of the plurality of communication assets to be disabled may comprise providing a recommendation to an administrator of device 110 that the at least one of the plurality of communication assets be manually disabled and/or preventing operation of the at least one of the plurality of communication assets. For example, a recommendation and/or warning message may be displayed on an admin console and/or sent via a messaging platform such as email to an administrator. In some implementations, causing the at least one of the plurality of communication assets to be disabled may comprise preventing operation of the at least one of the plurality of communication assets. For example, causing an NFC reader to be disabled may comprise disabling power to the reader while causing a web server to be disabled may comprise stopping the web server application and/or service from accepting communication requests and/or stopping it from executing completely.

In some implementations, the instructions 130 to cause the at least one of the plurality of communication assets to be disabled may further comprise instructions to notify an administrator of an attempt to utilize the communication asset after causing the at least one of the plurality of communication assets to be disabled. For example, if a web server asset has been disabled, an administrator of device 110 may be notified if further connections to the web server are attempted.

Figure 2:
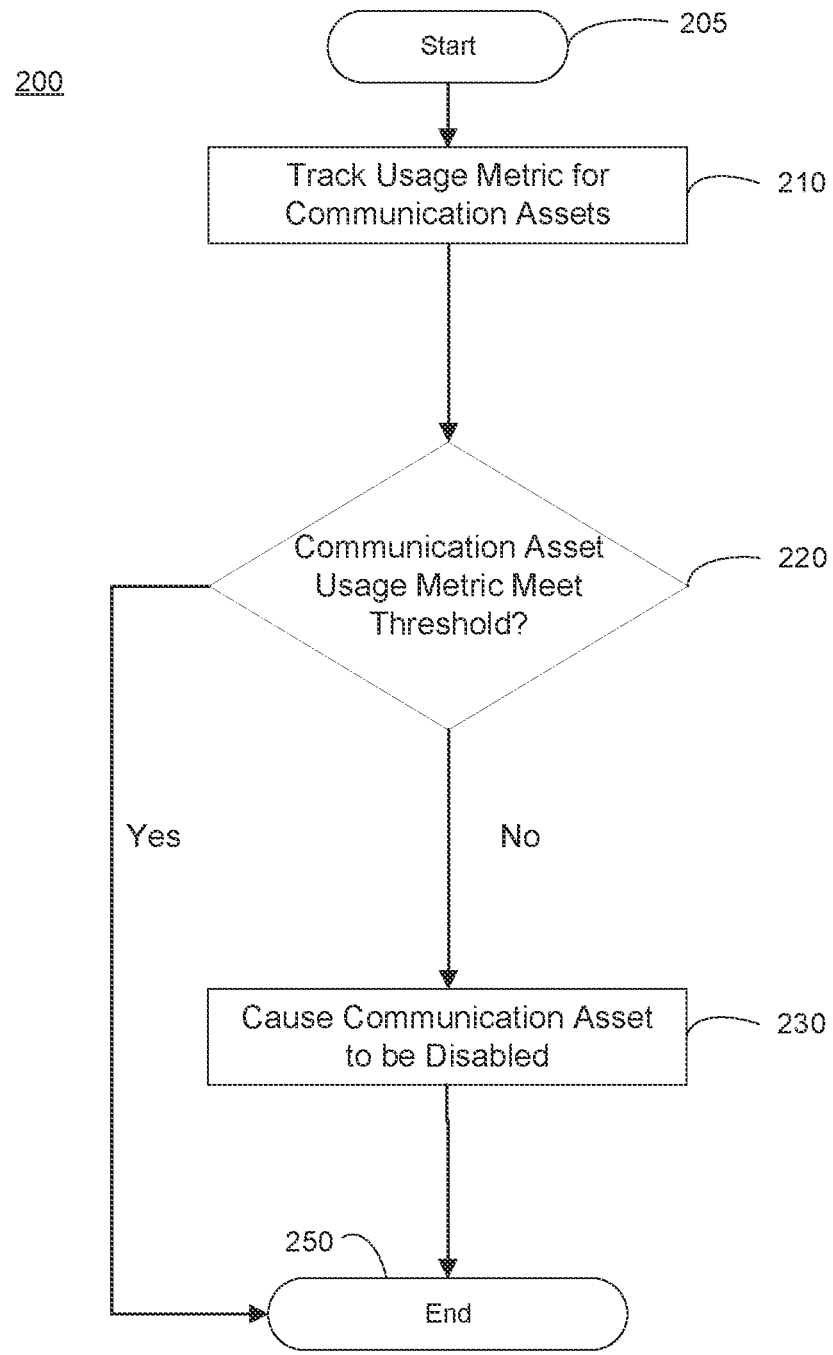
FIG. 2 is a flowchart of an example method for providing communication asset usage tracking.

FIG. 2 is a flowchart of an example method 200 for communication asset usage tracking. Although execution of method 200 is described below with reference to computing device 110, other suitable components for execution of method 200 may be used.

Method 200 may begin at stage 205 and advance to stage 210 where device 110 may track a usage metric for each of a plurality of communication assets. For example, device 110 may execute record usage metric instructions 120 to record, for at least one of a plurality of communication assets, at least one usage metric. The communication assets may comprise, for example, a network port, an application, a service, a physical communication link such as a USB port and/or communication cable, and/or a wireless communication link, such as RFID, NFC, Bluetooth, WiFi, etc. In some implementations, the usage metric may comprise a last used time for the at least one of the plurality of communication assets, a usage frequency for the at least one of the plurality of communication assets, a count of requests to use the at least one of the plurality of communication assets within a time period, and/or a count of unique users who request to use the at least one of the plurality of communication asset.

Method 200 may then advance to stage 220 where computing device 110 may determine whether the usage metric fails to meet a threshold for each of the plurality of communication assets. For example, device 110 may execute usage metric threshold instructions 125 to determine, for the at least one of the plurality of communication assets, whether the at least one usage metric fails to meet a threshold. For example, a threshold for a usage metric comprising a last used time may comprise a usage frequency and/or an amount of time since the last time the communication asset was used, such as a 30 day threshold. If the communication asset has not been used within the threshold amount of time, instructions 125 may determine that the usage metric has failed to meet the threshold. For another example, a threshold for a usage metric comprising a count of requests and/or users of the communication asset may comprise a minimum number to be considered not to have failed to meet the threshold (e.g., two uses and/or users within the last 30 days would not satisfy a threshold of five uses). In some implementations, multiple thresholds may need to be met to avoid a communication asset being disabled.

In response to determining that the usage metric fails to meet the threshold for at least one of the plurality of communication assets, method 200 may advance to stage 230 where computing device 110 may cause the at least one of the plurality of communication assets to be disabled. For example, device 110 may execute usage metric threshold instructions 125 to determine, for the at least one of the plurality of communication assets, whether the at least one usage metric fails to meet a threshold. For example, a threshold for a usage metric comprising a last used time may comprise a usage frequency and/or an amount of time since the last time the communication asset was used, such as a 30 day threshold. If the communication asset has not been used within the threshold amount of time, instructions 125 may determine that the usage metric has failed to meet the threshold. For another example, a threshold for a usage metric comprising a count of requests and/or users of the communication asset may comprise a minimum number to be considered not to have failed to meet the threshold (e.g., two uses and/or users within the last 30 days would not satisfy a threshold of five uses). In some implementations, multiple thresholds may need to be met to avoid a communication asset being disabled.

After causing the at least one of the plurality of communication assets to be disabled at stage 230, or if the usage metric was determined to not have been failed at stage 220, method 200 may end at stage 250.

Figure 3:
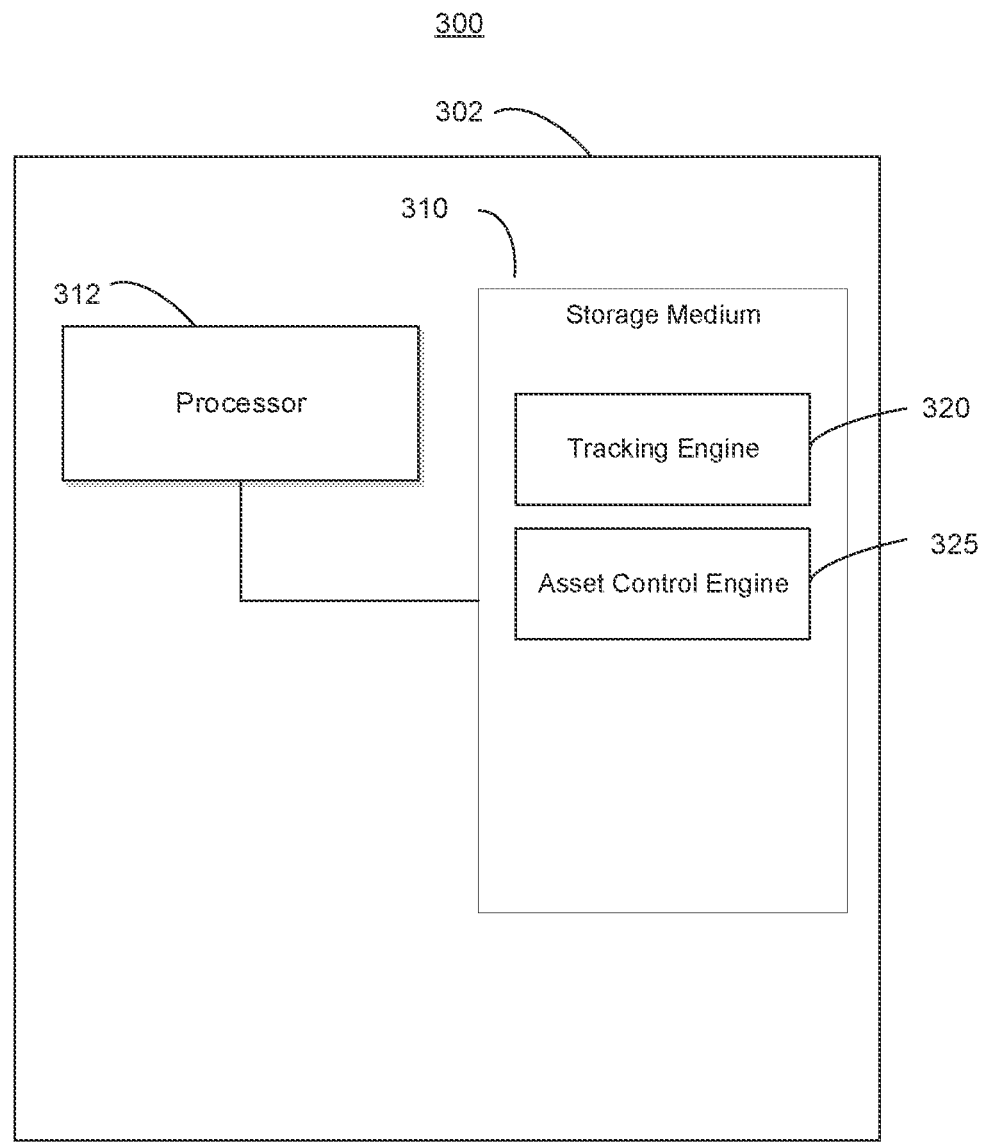
FIG. 3 is a block diagram of an example system for providing communication asset usage tracking.

FIG. 3 is a block diagram of an example apparatus 300 for providing communication asset usage tracking. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a tracking engine 320 and an asset control engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Tracking engine 320 may track a usage metric for each of a plurality of communication assets, and determine whether the usage metric fails to meet a threshold for at least one of the plurality of communication assets. For example, tracking engine 320 may execute record usage metric instructions 120 to record, for at least one of a plurality of communication assets, at least one usage metric. The communication assets may comprise, for example, a network port, an application, a service, a physical communication link such as a USB port and/or communication cable, and/or a wireless communication link, such as RFID, NFC, Bluetooth, WiFi, etc. In some implementations, the usage metric may comprise a last used time for the at least one of the plurality of communication assets, a usage frequency for the at least one of the plurality of communication assets, a count of requests to use the at least one of the plurality of communication assets within a time period, and/or a count of unique users who request to use the at least one of the plurality of communication asset.

In some implementations, tracking engine 320 may execute usage metric threshold instructions 125 to determine, for the at least one of the plurality of communication assets, whether the at least one usage metric fails to meet a threshold. For example, a threshold for a usage metric comprising a last used time may comprise a usage frequency and/or an amount of time since the last time the communication asset was used, such as a 30 day threshold. If the communication asset has not been used within the threshold amount of time, instructions 125 may determine that the usage metric has failed to meet the threshold. For another example, a threshold for a usage metric comprising a count of requests and/or users of the communication asset may comprise a minimum number to be considered not to have failed to meet the threshold (e.g., two uses and/or users within the last 30 days would not satisfy a threshold of five uses). In some implementations, multiple thresholds may need to be met to avoid a communication asset being disabled.

Asset control engine 325 may, in response to determining that the usage metric fails to meet the threshold for the at least one of the plurality of communication assets, disable the at least one of the plurality of communication assets. For example, asset control engine 325 may execute usage metric threshold instructions 125 to determine, for the at least one of the plurality of communication assets, whether the at least one usage metric fails to meet a threshold. For example, a threshold for a usage metric comprising a last used time may comprise a usage frequency and/or an amount of time since the last time the communication asset was used, such as a 30 day threshold. If the communication asset has not been used within the threshold amount of time, instructions 125 may determine that the usage metric has failed to meet the threshold. For another example, a threshold for a usage metric comprising a count of requests and/or users of the communication asset may comprise a minimum number to be considered not to have failed to meet the threshold (e.g., two uses and/or users within the last 30 days would not satisfy a threshold of five uses). In some implementations, multiple thresholds may need to be met to avoid a communication asset being disabled.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine readable medium storing instructions executable by a processor to:
    record, for at least one of a plurality of communication assets, at least one usage metric;
    determine, for the at least one of the plurality of communication assets, whether the at least one usage metric fails to meet a threshold;
    in response to determining that the at least one usage metric fails to meet the threshold, cause the at least one of the plurality of communication assets to be disabled; and
    generate a notification of an attempt to utilize the communication asset after causing the at least one of the plurality of communication assets to be disabled.

2. The non-transitory machine readable medium of claim 1, wherein the plurality of communication assets each comprise at least one of the following: a network port, a service, a physical communication link, and a wireless communication link.

3. The non-transitory machine readable medium of claim 1, wherein the at least one usage metric comprises a last used time for the at least one of the plurality of communication assets.

4. The non-transitory machine readable medium of claim 3, wherein the threshold comprises a usage frequency.

5. The non-transitory machine readable medium of claim 1, wherein the at least one usage metric comprises a count of requests to use the at least one of the plurality of communication assets within a time period.

6. The non-transitory machine readable medium of claim 5, wherein the threshold comprises a minimum number of requests to use the at least one of the plurality of communication assets within the time period.

7. The non-transitory machine readable medium of claim 1, wherein the at least one usage metric comprises a count of unique users who request to use the at least one of the plurality of communication assets.

8. The non-transitory machine readable medium of claim 1, wherein causing the at least one of the plurality of communication assets to be disabled comprises providing a recommendation to an administrator that the at least one of the plurality of communication assets be manually disabled.

9. The non-transitory machine readable medium of claim 1, wherein causing the at least one of the plurality of communication assets to be disabled comprises preventing operation of the at least one of the plurality of communication assets.

10. The non-transitory machine readable medium of claim 1, wherein the instructions to cause the at least one of the plurality of communication assets to be disabled further comprise instructions to notify an administrator of the attempt to utilize the communication asset after causing the at least one of the plurality of communication assets to be disabled.

11. A method comprising:
tracking a usage metric for each of a plurality of communication assets;
determining whether the usage metric fails to meet a threshold for each of the plurality of communication assets;
in response to determining that the usage metric fails to meet the threshold for at least one of the plurality of communication assets, causing the at least one of the plurality of communication assets to be disabled; and
generating a notification of an attempt to utilize the communication asset after causing the at least one of the plurality of communication assets to be disabled.

12. The method of claim 11, wherein the usage metric comprises a last used time for each of the plurality of communication assets.

13. The method of claim 12, wherein the threshold comprises a usage frequency.

14. The method of claim 11, wherein causing the at least one of the plurality of communication assets to be disabled comprises providing a recommendation to an administrator of a device associated with the plurality of communication assets that the at least one of the plurality of communication assets be manually disabled.

15. A system, comprising:
a tracking engine to:
track a usage metric for each of a plurality of communication assets, and
determine whether the usage metric fails to meet a threshold for at least one of the plurality of communication assets; and
an asset control engine to:
in response to determining that the usage metric fails to meet the threshold for the at least one of the plurality of communication assets, disable the at least one of the plurality of communication assets; and
generate a notification of an attempt to utilize the communication asset after causing the at least one of the plurality of communication assets to be disabled.

* * * * *